United States Patent [19]

Loiacono

[11] Patent Number: 4,690,523

[45] Date of Patent: Sep. 1, 1987

[54] MONOLITHIC REINFORCED EYEGLASS FRAME AND FRICTION WELDING METHOD FOR MANUFACTURING SAME

[75] Inventor: Joseph Loiacono, Ft. Salonga, N.Y.

[73] Assignee: Kenco Optics, Inc., Boca Raton, Fla.

[21] Appl. No.: 752,213

[22] Filed: Jul. 3, 1985

[51] Int. Cl.$^4$ ............................................... G02C 5/02
[52] U.S. Cl. ..................................... 351/129; 351/41; 351/178
[58] Field of Search ................... 351/129, 124, 93, 83, 351/41, 178

[56] References Cited

U.S. PATENT DOCUMENTS

| | | |
|---|---|---|
| 1,428,697 | 9/1922 | Leytham . |
| 2,243,770 | 5/1941 | Nerney . |
| 2,633,894 | 4/1953 | Carwile . |
| 2,997,917 | 8/1961 | Baer ...................................... 351/93 |
| 3,224,916 | 12/1965 | Soloff et al. . |
| 3,492,367 | 1/1970 | Starkweather, Jr. . |
| 3,562,041 | 2/1971 | Robertson . |
| 3,563,822 | 2/1971 | Fesh . |
| 3,601,478 | 8/1971 | Ramp . |
| 3,674,602 | 7/1972 | Keogh et al. . |
| 3,745,641 | 7/1973 | Paolini . |
| 3,970,491 | 7/1976 | Pezarro . |
| 3,996,082 | 12/1976 | Leatherman . |
| 4,058,421 | 11/1977 | Summo . |
| 4,106,962 | 8/1978 | Adams et al. . |
| 4,302,080 | 11/1981 | Bononi . |
| 4,326,902 | 4/1982 | Peddie . |
| 4,326,903 | 4/1982 | Summo . |
| 4,352,711 | 10/1952 | Toth . |
| 4,430,148 | 2/1984 | Schaefer . |
| 4,462,849 | 7/1984 | MacLaughlin et al. . |
| 4,477,307 | 10/1984 | Cearlock et al. . |
| 4,592,629 | 6/1986 | Giacomelli . |

OTHER PUBLICATIONS

"SMF Plastic Friction Welding Machine", of Mecasonic SA, Bas-Monthous, France.

Primary Examiner—Rodney B. Bovernick
Assistant Examiner—D. M. Dzierzynski
Attorney, Agent, or Firm—Hoffmann, Dilworth, Barrese & Baron

[57] ABSTRACT

An eyeglass frame is disclosed which comprises a monolithic, one piece front member fabricated of thermoplastic resin and having a unitary brow bar and a pair of lens rims depending therefrom, there being an elongated reinforcement member fully embedded within said front member.

The foregoing eyeglass frame front member is manufactured by the method which comprises:-

(a) superimposing a first thermoplastic resin sheet upon a second thermoplastic sheet with a reinforcement element disposed therebetween, the adjacent surfaces of said sheets being in substantial contact with each other;

(b) applying a pressure force to the outer surfaces of said first and second thermoplastic sheets in a direction which is transverse to the lengths thereof to force said sheets toward one another with said reinforcements element disposed therebetween; and (c) apply a motion to one of said thermoplastic sheets relative to the other while said sheets are under pressure thereby creating frictional heat sufficient to melt the thermoplastic resin at the interface of the two sheets such that upon cooling of the sheets to below the melt temperature of the molten thermoplastic resin, there will be provided a monolithic one piece front member suitable for finishing into a corresponding monolithic reinforced eyeglass frame front member.

18 Claims, 5 Drawing Figures

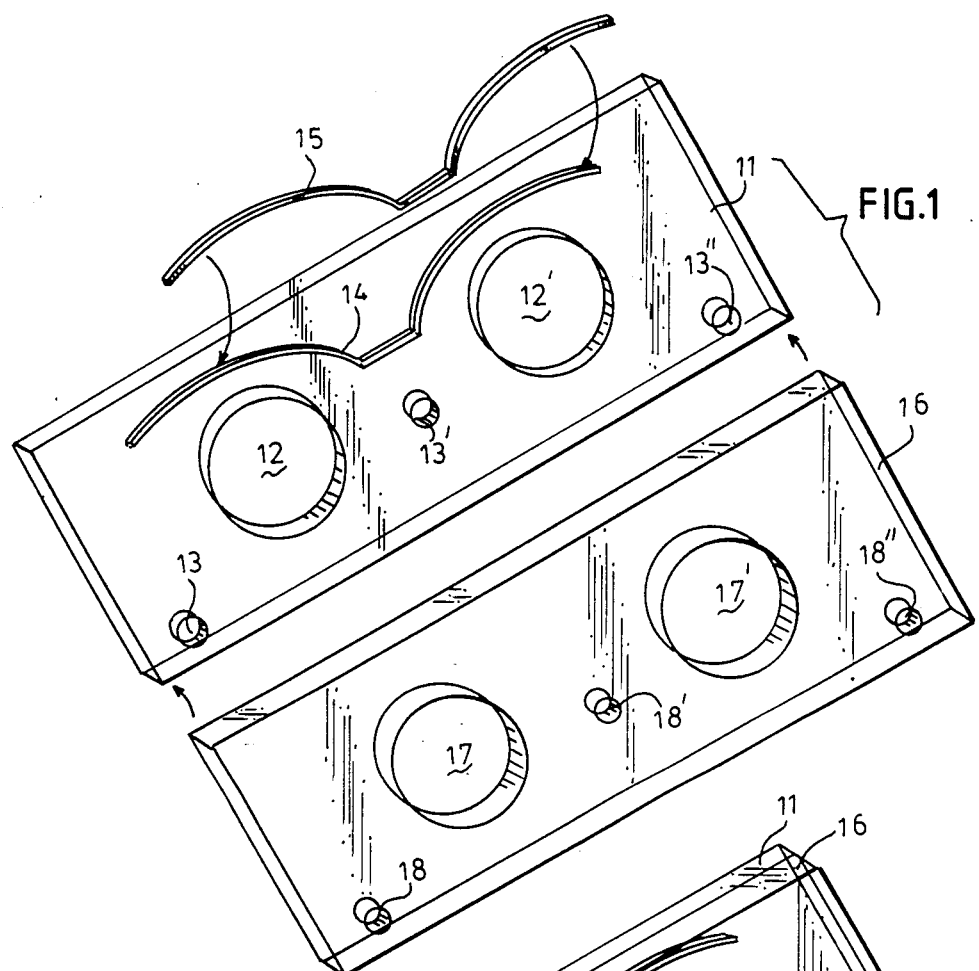
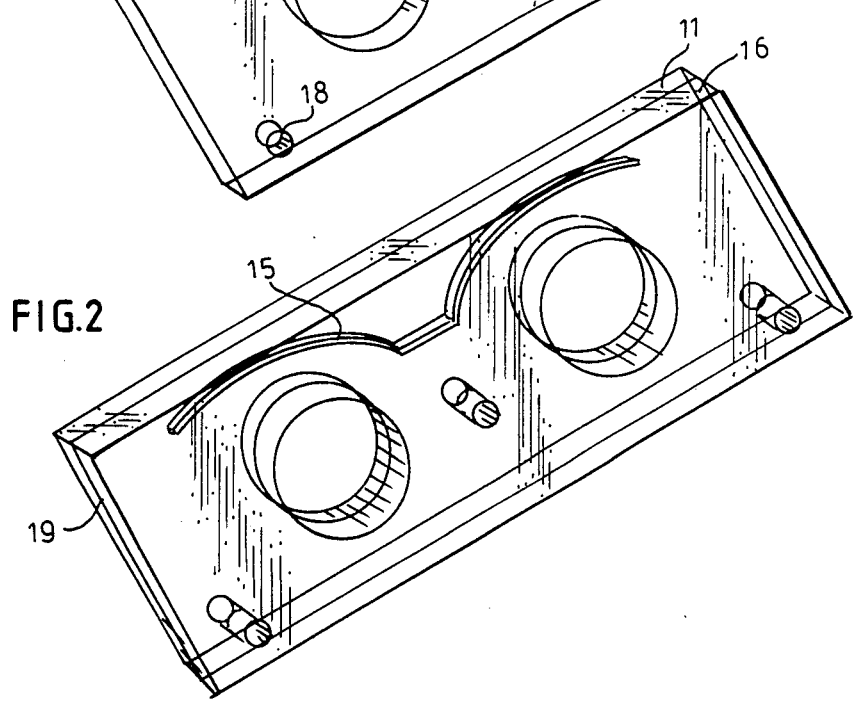

MONOLITHIC REINFORCED EYEGLASS FRAME AND FRICTION WELDING METHOD FOR MANUFACTURING SAME

BACKGROUND OF THE INVENTION

This invention relates to the field of eyeglass frames and to a method of manufacturing a monolithic reinforced eyeglass frame employing a friction welding technique.

Eyeglass frames featuring a reinforcement element spanning the bridge portion of the frame are known from U.S. Pat. Nos. 1,428,697; 2,243,770; and 3,601,478. Currently, where it is desired to provide a reinforced eyeglass frame fabricated from a synthetic resin with the reinforcement member entirely embedded therein, the reinforcement number is sandwiched between two sheets of resin which are then bonded together with an adhesive. The resulting laminate is then machined, e.g., by routing, to provide a rough, or semi-finished, frame which is subsequently processed to provide the fully finished frame. This manufacturing technique results in a frame possessing a seam along the line where the resin sheets from which the frame is fabricated have been adhesively joined. Such a seam is undesirable from an aesthetic standpoint but, more importantly, is a potential site of structural weakness.

Friction welding is a known procedure for joining thermoplastic elements. In general, this technique involves frictionally heating the interface between the surfaces of the thermoplastic workpieces which are to be joined by applying contact pressure while at the same time rotating the workpieces relative to each other or imparting some other motion, e.g., an oscillating or linear reciprocating one, which will generate sufficient frictional heat to melt the thermoplastic at the interface. When such a molten state is achieved, the rotation or other frictional movement is discontinued while contact pressure is maintained until such time as the interface has solidified. The specific operational parameters selected are dependent in large measure on the nature of the thermoplastic materials involved, the configuration of the work pieces, the surface area of the interface, and so forth. Descriptions of various friction welding procedures and apparatus therefor can be found in U.S. Pat. Nos. 2,633,894; 3,970,491; 4,352,711; and 4,477,307 among others.

So far as is known, a monolithic reinforced eyeglass frame possessing a reinforcement member fully embedded therein has heretofore not been described. The term "monolithic" as used herein refers to a seamless reinforced eyeglass frame, i.e., one which appears to have been formed from, and structurally behaves as if it were in fact, a single sheet of thermoplastic material although in reality it is formed from adjacent thermoplastic sheets which have been friction welded together.

SUMMARY OF THE INVENTION

In accordance with the present invention, an eyeglass frame is provided which comprises a monolithic, one piece front member fabricated of thermoplastic resin and having a unitary brow bar and a pair of lens rims depending therefrom, their being an elongated reinforcement member fully embedded within said front member.

The foregoing eyeglass frame front member is manufactured by the method which comprises:

(a) superimposing a first thermoplastic resin sheet upon a second thermoplastic sheet with a reinforcement element disposed therebetween, the adjacent surfaces of said sheets being in substantial contact with each other;

(b) applying a pressure force to the outer surfaces of said first and second thermoplastic sheets in a direction which is transverse to the lengths thereof to force said sheets toward one another with said reinforcement element disposed therebetween; and (c) apply a motion to one of said thermoplastic sheets relative to the other while said sheets are under pressure thereby creating frictional heat sufficient to melt the thermoplastic resin at the interface of the two sheets such that upon cooling of the sheets to below the melt temperature of the molten thermoplastic resin, there will be provided a monolithic one piece frame front member suitable for finishing into a corresponding monolithic reinforced eyeglass frame front member.

The eyeglass frame herein is structurally strong, attractive and is readily configured to provide the sort of thin frames which have received wide consumer acceptance.

BRIEF DESCRIPTION OF THE DRAWINGS

The appended drawings are illustrative of successive steps in the method of manufacturing the monolithic reinforced eyeglass frame of this invention in which:

FIG. 1 is a perspective exploded view of the initial assembly stage showing the relationship between the upper and lower thermoplastic sheets elements and reinforcement member;

FIG. 2 is a perspective view of the superimposed sheet elements as their adjacent surfaces are about to be friction welded;

DESCRIPTION OF THE PREFERRED EMBODIMENTS

Figure 3:
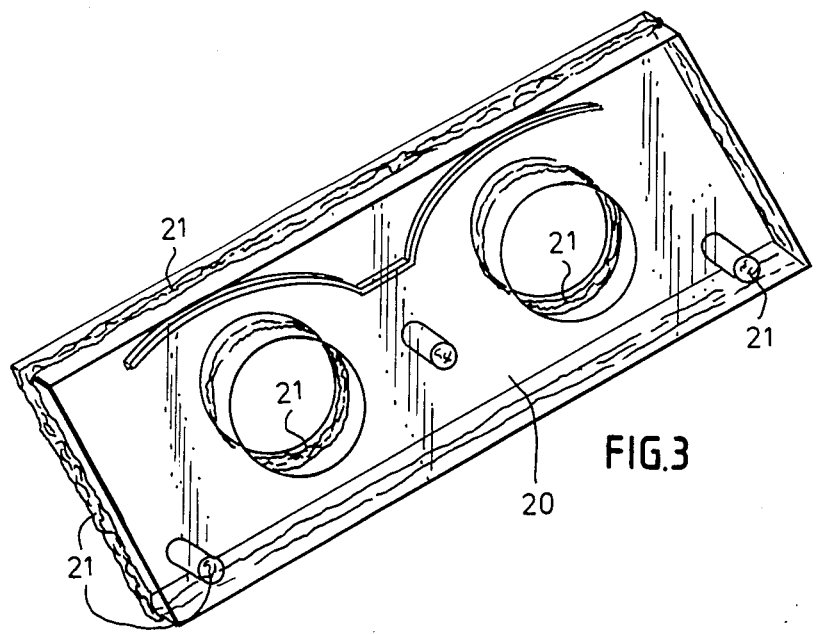
FIG. 3 is a perspective view of the superimposed sheet elements following the friction welding operation.

In accordance with FIG. 1, lower thermoplastic tablet, or sheet, member 11 having cutouts 12 and 12' which will ultimately be contoured in the finished frame to accept lenses is provided with shafts 13, 13' and 13" which fill with excess molten resin during the welding operation and groove 14 for accommodating wire-shaped reinforcement member 15. A somewhat thicker upper thermoplastic tablet, or sheet, member 16 essentially identical with lower sheet member 11 and preferably fabricated from the same resin as the latter or one which is similar or at least compatible therewith is likewise provided with lens cutouts 17 and 17' and shafts 18, 18' and 18". The length, width and thickness of sheets 11 and 16 will vary depending upon the desired dimensions of the finished frame. In one common example, the length and width of sheets 11 and 16 will be from 150 to 170 millimeters and from about 60 to 70 millimeters, respectively. Sheet 11 which will ultimately constitute the front side of the frame will ordinarily be somewhat thinner than sheet 16 which will become the rear nose pad-bearing side of the frame. In the example given, sheet 11 can be from about 3.5 to 4.5 millimeters in thickness while sheet 16 can be from about 5.5 to 6.5 millimeters in thickness. Sheet members 11 and 16 can be fabricated from any of the thermoplastic resins heretofore employed in the construction of eyeglass such as the acrylics, polyamides or other engineering plastic. Member 15, while it can be manufactured from a metal such as steel, can also be formed from any other metallic or non-metallic material which functions as a reinforcement, e.g., carbon fiber.

When, as shown in FIG. 2, reinforcement 15 is inserted in groove 14 and sheet 16 is superimposed upon sheet 11 such that their shafts 13 and 18, 13' and 18' and 13" and 18" are substantially in registry, reinforcement 15 will be completely surrounded by plastic and the adjacent surfaces of the sheets will be ready for joining into a monolithic unit employing the friction welding technique herein.

In one manner of carrying out this technique, the assembly shown in FIG. 2 is placed within a well or depression defined with the lower moving impression plate of a friction welding apparatus such as that manufactured by Mecasonic SA, Bas-Monthoux 74100 Annemasse, France. The upper moving impression plate in this apparatus is then pressed against the upper surface of the assembly leaving a small air space between it and the lower moving impression plate. The pressure applied to the assembly by the impression plates is at least about 60 p.s.i. and is preferably on the order of from about 150 to 400 p.s.i. While this pressure is maintained, one, and preferably both, impression plates are set in motion relative to each other. The motion is of an amplitude and frequency which will create frictional heat at interface 19 of sheets 11 and 16 sufficient to melt the thermoplastic in that region. The motion can be a longitudinal, or oscillatory, one or it can be through the arc of a circle. A peak-to-peak displacement of sheet 11 relative to sheet 16 on the order of from about 1 to about 5 millimeters, preferably from about 2 to 4 millimeters, and a frequency of from about 80 to 300 Hertz, preferably from about 100 to about 250 Hertz, which is maintained for from 30 seconds to about 3 minutes, preferably from about 1 to 2 minutes, is generally sufficient to provide sufficient melting of the thermoplastic resin in the region of interface between sheets 11 and 16. When sufficient melting of thermoplastic in the interface region has been achieved, the motion is discontinued and while pressure is maintained, the moltent resin is permitted to harden. As those skilled in this art will readily appreciate, the operational parameters can be easily determined for a particular friction welding operation.

Figure 4:
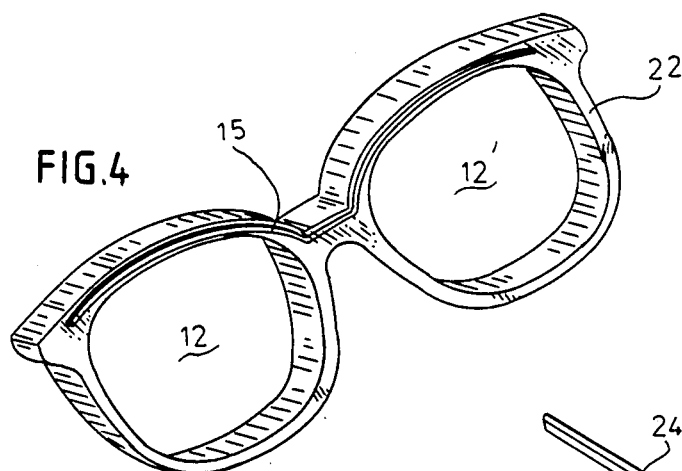
FIG. 4 is a perspective view of a rough-machined monolithic reinforced eyeglass frame; and, FIG. 5 is a perspective view of the finished monolithic reinforced eyeglass frame.
Figure 5:
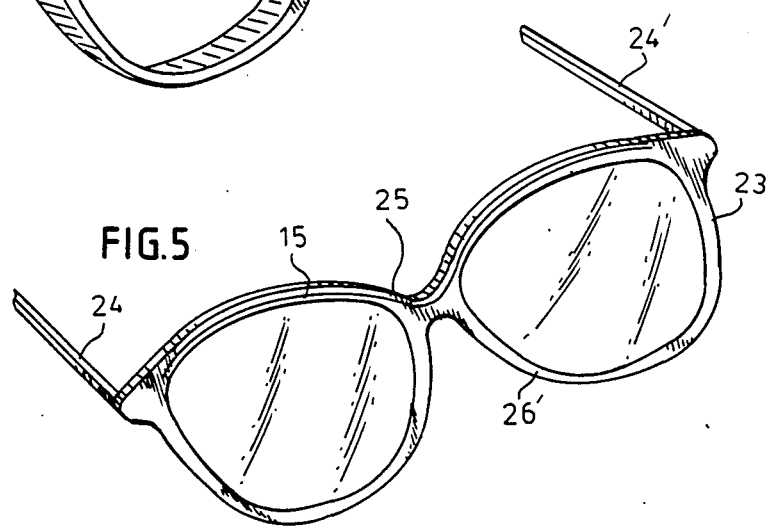

Upon cooling of the molten thermoplastic material resulting from the foregoing friction welding procedure to or below its solidification point, a monolithic, one piece member 20 as shown in FIG. 3 will result. Excess solidified resin 21 extends beyond the edges of the joined sheets and tends also to fill shafts 13-18, 13'-18' and 13"-18". In this condition monolithic frame member is ready to be rough-machined, e.g. by routing, to form semi-finished frame front member 22 with reinforcement member 15 fully embedded therein as shown in FIG. 4. Following finishing of said frame member, there is provided the completed monolithic, one piece frame front member 23 (showing a portion of temple pieces 24 and 24' in place) of FIG. 5. In said frame front member, reinforcement 15 is shown embedded in unitary brow bar 25 from which lens rims 26 and 27' depend. The rough-machining and finishing operations employed in providing the frame members of FIGS. 4 and 5 are well known and do not in themselves constitute a part of this invention.

It is thus seen that herein shown and described is a method of bonding two thermoplastic sheets together wherein the sheets receive the energy of a vibration-causing source whereby said energy causes the plastic material at the interface of the sheets to be softened and to flow into itself, the result being that a monolithic unit is formed. The method enables the accomplishment of the objects and advantages mentioned above, and while only one embodiment of the invention has been disclosed herein, variations thereof beyond those herein mentioned may occur to those skilled in the art. It is contemplated that all such variations not departing from the spirit and scope of the invention hereof are to be construed in accordance with the following claims.

What is claimed is:

1. A method for manufacturing a monolithic eyeglass frame member fabricated from thermoplastic resin and having a reinforcement member fully embedded therein which comprises:
   (a) superimposing a first thermoplastic resin sheet upon a second thermoplastic sheet with a reinforcement element disposed therebetween, the adjacent surfaces of said sheets being in substantial contact with each other;
   (b) applying a pressure force to the outer surfaces of said first and second thermoplastic sheets in a direction which is transverse to the lengths thereof to force said sheets toward one another with said reinforcements element disposed therebetween;
   (c) applying a motion to one of said thermoplastic sheets relative to the other while said sheets are under pressure thereby creating frictional heat sufficient to melt the thermoplastic resin at the interface of the two sheets such that upon cooling of the sheets to below the melt temperature of the molten thermoplastic resin, there is provided a monolithic, one piece frame front member ready for rough-machining;
   (d) rough-machining the one piece frame front member to provide semi-finished frame front member; and,
   (e) finishing the semi-finished frame front member to provide a finished monolithic eyeglass frame front member.

2. The method of claim 1 wherein the thickness of the second thermoplastic sheet is thinner than that of the first thermoplastic sheet.

3. The method of claim 2 wherein the thickness of the second thermoplastic sheet is from about 3.5 to 4.5 millimeters and the thickness of the first thermoplastic sheet is from about 5.5 to about 6.5 millimeters.

4. The method of claim 3 wherein the length of the first and second thermoplastic sheets is from about 150 to 170 millimeters and the width of said sheets is from about 60 to 70 millimeters.

5. The method of claim 1 wherein the reinforcement element is disposed within a groove defined within the upper surface of the second thermoplastic sheet.

6. The method of claim 5 wherein the groove is defined along a portion of the length of the upper surface of the second thermoplastic sheet and a few millimeters from the upper edge thereof.

7. The method cf claim 1 wherein the reinforcement element is formed from a metal or a non-metal.

8. The method of claim 7 wherein the metal is steel.

9. The method of claim 7 wherein the non-metal is carbon fiber.

10. The method of claim 1 wherein the thermoplastic resin is an acrylic resin or a polyamide.

11. The method of claim 1 wherein the pressure is at least about 60 p.s.i.

12. The method of claim 11 wherein the pressure is from about 150 to 400 p.s.i.

13. The method of claim 1 wherein the motion is an oscillatory one or is through the arc of a circle.

14. The method of claim 1 wherein the peak-to-peak displacement of the first sheet relative to the second sheet is from about 1 to 5 millimeters.

15. The method of claim 14 wherein the peak-to-peak displacement of the first sheet relative to the second sheet is from about 2 to 4 millimeters.

16. The method of claim 1 wherein the frequency of the motion is from about 80 to 300 Hertz.

17. The method of claim 16 wherein the frequency of the motion is from about 100 to about 250 Hertz.

18. The method of claim 1 wherein the motion is maintained from about 30 seconds to about 3 minutes.

* * * * *